United States Patent [19]
Malohn

[11] Patent Number: 5,323,603
[45] Date of Patent: Jun. 28, 1994

[54] INTEGRATED AIR CYCLE-GAS TURBINE ENGINE

[75] Inventor: Donald A. Malohn, Scottsdale, Ariz.

[73] Assignee: Tiernay Turbines, Phoenix, Ariz.

[21] Appl. No.: 28,358

[22] Filed: Mar. 9, 1993

Related U.S. Application Data

[62] Division of Ser. No. 804,048, Dec. 9, 1991, Pat. No. 5,212,942, which is a division of Ser. No. 611,418, Nov. 9, 1990, Pat. No. 5,105,617.

[51] Int. Cl.$^5$ ............................................. F02C 6/00
[52] U.S. Cl. .......................... 60/39.07; 60/39.183; 60/39.511
[58] Field of Search .......... 60/39.04, 39.07, 39.161, 60/39.17, 39.183, 39.511, 728

[56] References Cited

U.S. PATENT DOCUMENTS

| | | | |
|---|---|---|---|
| 2,565,324 | 8/1951 | Ray | 60/39.29 |
| 3,261,659 | 7/1966 | Schwichtenberg et al. | 60/39.07 |
| 3,609,967 | 10/1971 | Waldmann | 60/39.183 |
| 3,796,045 | 3/1974 | Foster-Pegg | 60/39.02 |
| 4,733,526 | 3/1988 | Garrett | 60/39.07 |

Primary Examiner—Louis J. Casaregola
Attorney, Agent, or Firm—Louise S. Heim

[57] ABSTRACT

An additional turbine, an air-to-water heat exchanger, and an air-to-air heat exchanger are added upstream of a recuperated gas turbine engine. Incoming air at atmospheric temperature is expanded and cooled in the additional turbine and then passes through the air-to-water heat exchanger where it is used to cool warm water to a suitable drinking temperature. The cool air then passes through the air-to-air heat exchanger, where it precools the incoming atmospheric temperature air. The output shaft of the additional turbine is coupled to an additional compressor downstream of the original compressor of the engine, thus resulting in a higher net pressure ratio.

2 Claims, 7 Drawing Sheets

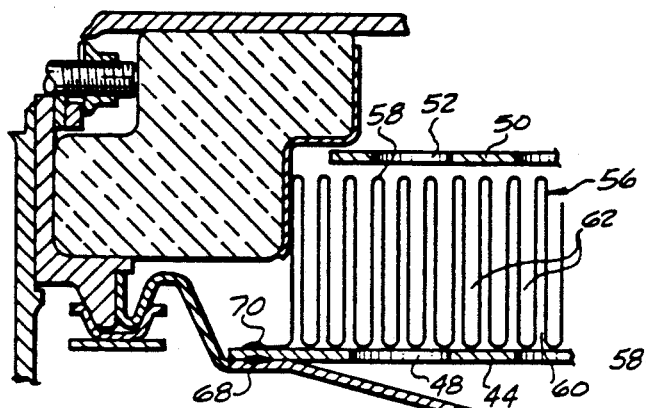
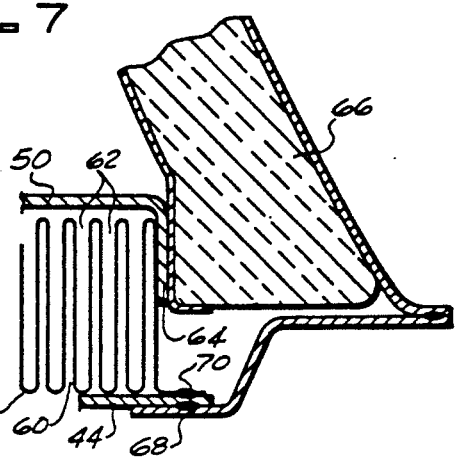
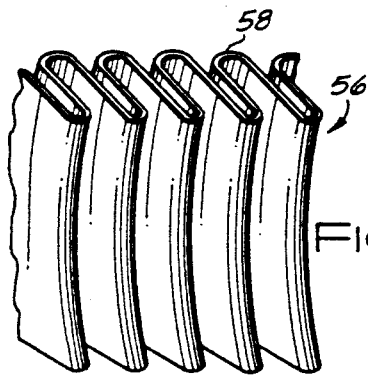
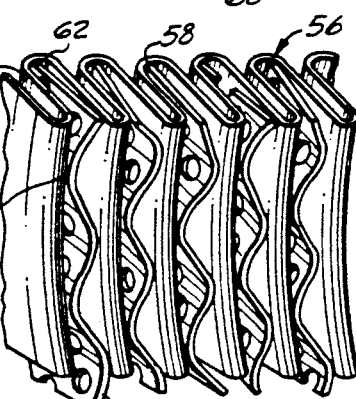
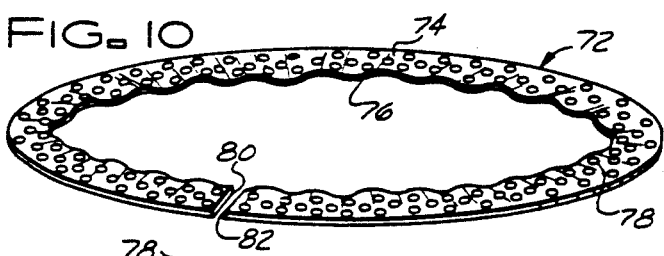
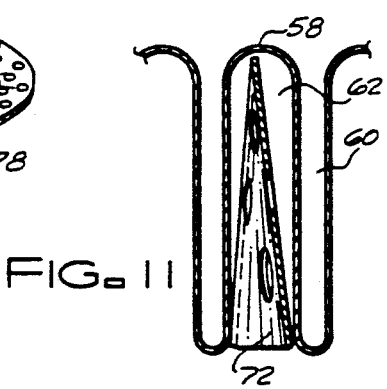
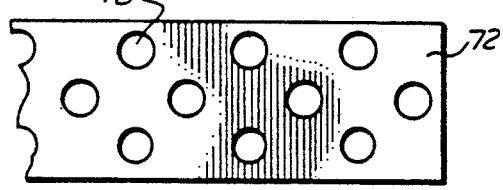
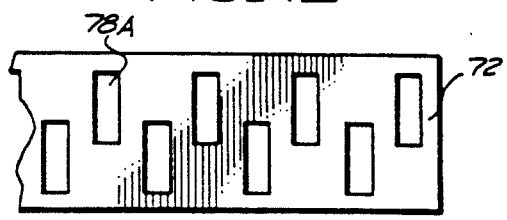
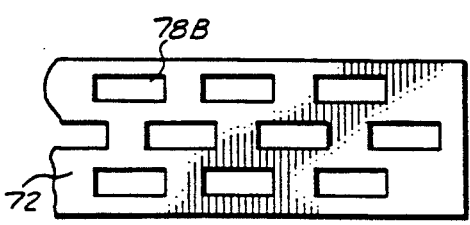

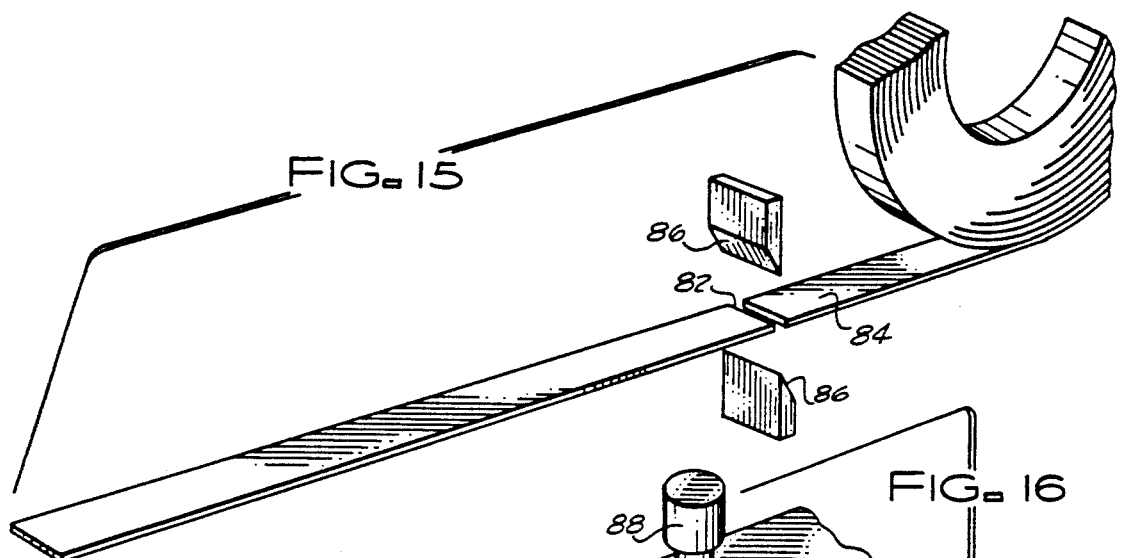
FIG. 15
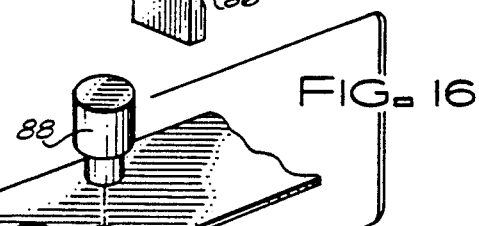
FIG. 16
FIG. 17
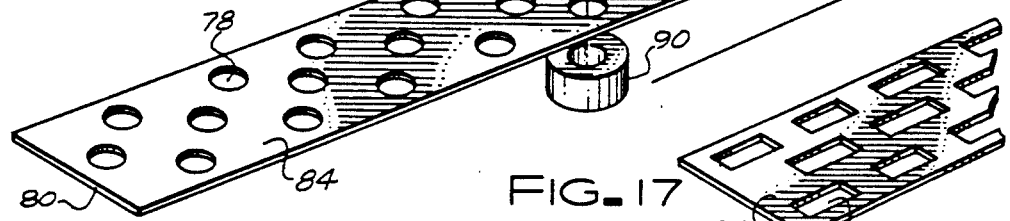
FIG. 18
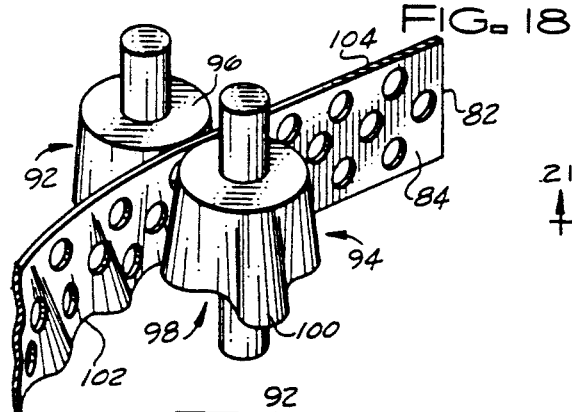
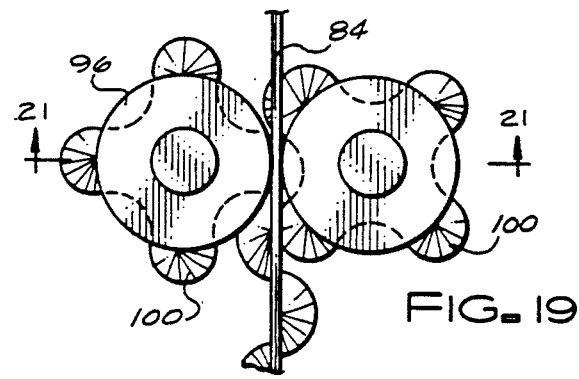
FIG. 19
FIG. 21
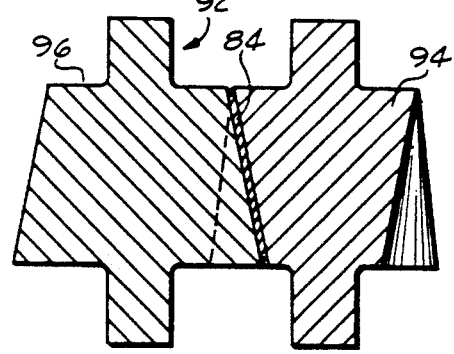
FIG. 20

INTEGRATED AIR CYCLE-GAS TURBINE ENGINE

CROSS-REFERENCE TO RELATED APPLICATIONS

This is a divisional of U.S. Pat. application Ser. No. 804,048, filed Dec. 9, 1991, now U.S. Pat. No. 5,212,942 which was a divisional of U.S. Pat. application Ser. No. 611,418, which was filed Nov. 9, 1990, and is now U.S. Pat. No. 5,105,617.

BACKGROUND OF THE INVENTION

1. Field of the Invention

This invention relates in general to turbine engines.

More particularly, the invention relates to a turbine engine having an improved recuperator which utilizes the high temperature gases exhausted from the turbine to preheat compressed air from the compressor prior to its entry into the combustor.

In a further and more specific aspect, the invention relates to a recuperated gas turbine engine integrated with an air-conditioning or cooling cycle.

2. Prior Art

A simple gas turbine engine or power plant comprises a combustion chamber having inlets for receiving compressed air and fuel, a compressor for compressing the air prior to its entry into the combustion chamber, and a turbine for extracting energy from the hot gases exhausted from the combustor. A portion of the energy extracted by the turbine is used to rotate a drive shaft coupled to the compressor.

Numerous techniques are known for increasing the thermal efficiency, and thereby decreasing the net fuel consumption, of such an engine. One common technique is to direct the hot exhaust gases from the turbine through a heat exchanger, known as a recuperator, which heats the comparatively cold air from the compressor prior to its entry into the combustor. As a result, less fuel is required in the combustor for producing a given turbine inlet temperature.

Prior art recuperators have taken a multitude of different configurations. One common type of recuperator is the tubular type, which comprises a plurality of parallel tubes oriented parallel to the engine centerline in an annular matrix with an inlet manifold at one end and an outlet manifold at the other end. Another common type of recuperator comprises a plurality of plates of relatively thin material, so formed and stacked as to provide heat transfer through the plates to and from a series of alternate flow passages formed between the stacked, alternate plates.

Both the tubular type and the stacked plate type of recuperators suffer from a number of shortcomings which reduce their overall thermal efficiency and/or make them impractical for many applications. For instance, the tubular type recuperators utilize a large amount of external ducting, and require a large amount of space in an engine. Thus, they are unsuitable for use in environments such as automotive and jet engines, where compact size and minimal weight are essential. Stacked-plate type recuperators require a large amount of welding and brazing, which means that all the components must be constructed of compatible materials. Thus, even those components which only come into contact with the relatively low temperature (approximately 350° F.) air from the compressor must be constructed from the same high grade alloys as those components which come into contact with the high temperature (approximately 1400° F.) turbine exhaust. This adds unnecessarily to the cost of manufacturing the engine.

Another problem confronting the designers of prior art recuperators has been the high amount of thermal stress due to the large temperature gradients in the different components of the recuperator, and the thermal expansions and distortions which result. Still another problem has been the lack of adequate sealing between adjacent flow passages of the recuperation resulting in leakage of the high pressure air from the compressor into the low pressure side of the recuperator Thus the overall pressure ratio, and as a result, the efficiency, of the system is reduced.

Another shortcoming of prior art recuperated engines has been that the recuperator usually encompasses only a small part of the engine. Thus, only a fraction of the waste heat generated by the turbine and combustor actually passes through the heat exchanger. The rest of the heat is lost through radiation.

Another factor affecting the efficiency of gas turbine recuperators is the amount of turbulence within the fluid flow passages It is generally well known that heat transfer is most efficient when the flow is in the turbulent regime. Commonly, turbulence is induced by inserting strips or rods of twisted metal, known as turbulators, into the flow passages of a recuperator. However, this has only been possible with flow passages of relatively simple construction, such as in straight tube-type recuperators. Other types of recuperators having convoluted or very small-diameter flow passages have not been suitable for the inclusion of turbulators.

In addition to recuperation, other techniques are known for increasing the net efficiency of a gas turbine engine. One technique is cogeneration, in which the waste heat from the energy. A problem with most cogeneration systems, however, is that the energy output varies according to the load. Therefore, as the load decreases, the temperature of the turbine exhaust decreases as well. This is undesirable, since most boilers are designed for constant heat input.

Other ways of increasing the efficiency of an engine include intercooling and reheating. In intercooling, the incoming air is compressed in stages before entering the combustor. Between stages, the air passes through a heat exchanger, known as an intercooler, where the temperature of the air is lowered. In reheating a second combustor is added for raising the temperature of the gases to a maximum level. Both of these techniques increase the energy output of the engine, since the energy output is proportional to the difference between the lowest and highest temperatures in the system. However, even in these types of systems, a certain amount of energy is wasted, since no attempts have been made to utilize the heat drawn from the compressed air in the intercooler.

It would be highly advantageous, therefore, to remedy the foregoing and other deficiencies inherent in the prior art.

Accordingly, it is an object of the present invention to improve the thermal efficiency of a turbine engine.

Another object of the invention is to provide a gas turbine engine with a primary surface counterflow recuperative heat exchanger.

And another object of the invention is the provision of a recuperative heat exchanger which entirely surrounds the components of a gas turbine engine.

Still another object of the invention is to provide a recuperative heat exchanger with an improved configuration in which all waste heat is radiated from the hottest point in the engine to the coolest point, to ensure maximum thermal efficiency.

Yet another object of the invention is the provision of a gas turbine recuperator requiring minimal brazing and welding so that multiple alloys can be used.

And yet another object of the invention is to provide a gas turbine recuperator which eliminates the problem of leakage between high and low pressure flow passages.

Yet still another object of the invention is the provision of a gas turbine recuperator which is suitable for the inclusion of turbulators.

And a further object of the instant invention is to minimize the amount of external ducting in a recuperated gas turbine engine.

And yet a further object of the invention is to provide a recuperated gas turbine engine which can be integrated with an air-conditioning or cooling cycle.

And still a further object of the invention is the provision of a low-cost, lightweight Integrated air cycle-gas turbine engine according to the foregoing which is suitable for military applications.

SUMMARY OF THE INVENTION

Briefly, to achieve the desired objects of the instant invention in accordance with the preferred embodiments thereof, a gas turbine engine is provided with an improved recuperator for increasing the thermal efficiency of the system.

More specifically, the recuperator is a primary surface counterflow heat exchanges in the form of three concentric cylindrical shells which completely encircle the hottest components of the engine, including the turbine nozzle and the combustion chamber. The outermost shell includes a plurality of longitudinally spaced apart inlet openings which open into a header receiving relatively low temperature air from the compressor, and a plurality of longitudinally spaced apart outlet openings, diametrically opposite the inlet openings, which communicate with a connector duct leading to the combustion chamber. The innermost shell includes a plurality of inlet openings which receiving high temperature gases discharged from the turbine, and a plurality of outlet openings, diametrically opposite the inlet openings, which communicate with an exhaust duct leading out of the engine. The central shell is a corrugated tube which acts as a separator wall preventing mixing of the high pressure air discharged from the compressor with the low pressure gases discharged from the turbine, but allowing heat transfer therebetween. The spaces between each corrugation, or fold, of the central shell and the outer shell define a plurality of annular flow chambers for the high pressure, relatively low temperature air, while the corresponding spaces between the central shell and the inner shell define a plurality of annular flow chambers for the low pressure, relatively high temperature turbine exhaust gases.

The outer shell of the recuperator is preferably resistance-welded to the casing of the engine at each of its ends, and the opposite ends of the central shell are resistance welded to the outer shell at the same location. The inner shell, which is normally spaced from the folds of the central shell to allow for thermal expansion in a radial direction, is held in place at one end by a radially out-turned flange which is loosely clamped between the Central shell of the recuperator and an end wall of the casing. The opposite end of the inner shell is unrestrained, to allow for thermal expansion in a longitudinal direction. Because no brazing is required to hold the inner shell in place, compatibility of materials is not a consideration Thus, the inner shell, which is exposed to the extremely high temperature exhaust from the turbine, can be constructed from a relatively high grade alloy, while the central and outer shells, which are exposed to the lower temperature from the compressor, can be constructed from less expensive, lower grade alloys Specially configured turbulators are provided for inclusion between the corrugations of the central shell. Each turbulator is formed by punching a plurality of holes of a desired configuration into a thin, rectangular sheet of a malleable metal, and crimping one longitudinal edge of the sheet by passing it through a pair of meshing, dentate rollers. The shorter length of the crimped edge relative to the uncrimped edge causes the sheet to curve about an axis perpendicular to a line parallel to the crimped edge, until the lateral edges of the sheet nearly contact one another, and the sheet forms a slightly wavy ring. The pattern of waves and holes on the surface of each turbulator ring forces the fluid in the recuperator to take a tortuous path through the annular flow chambers, thus inducing turbulence for more efficient heat transfer.

In one embodiment of the invention, a gas turbine engine provided with the improved recuperator is part of a cogeneration system in which the waste heat from the turbine is exhausted into an energy recovery device such as a boiler for producing steam heat. A temperature-controlled valve is provided at the turbine outlet for regulating the proportion of waste heat passing through the recuperator relative to the amount of waste heat exhausting directly into the boiler, thus ensuring that the temperature of gases entering the boiler is constant.

In another embodiment of the invention, the recuperated gas turbine engine is incorporated into a cogeneration system using intercooling and reheating. More specifically, the inlet air is compressed in stages, and an air-to-water heat exchanger is interposed between the two stages. Warm water exiting the air-to-water heat exchanger can be delivered to the boiler downstream of the turbine exhaust, or it can be diverted to an alternative warm water output device such as a faucet.

In still another embodiment of the invention, the recuperated gas turbine engine may be integrated with an air cycle using a technique known as "boot strapping", in which an additional turbine, an air-to-water heat exchanger, and an air-to-air heat exchanger are added upstream of the engine. Incoming air at atmospheric temperature is expanded and cooled in the additional turbine and then passes through the air-to-water heat exchanger where it is used to cool warm water to a suitable drinking temperature. The cool air then passes through the air-to-air heat exchanger, where it precools the incoming atmospheric temperature air. The output shaft of the additional turbine is coupled to an additional compressor downstream of the original compressor of the engine, thus resulting in a higher net pressure ratio.

BRIEF DESCRIPTION OF THE DRAWINGS

The foregoing and further and more specific objects and advantages of the instant invention will become readily apparent to those skilled in the art from the following detailed description of the preferred embodiments thereof taken in conjunction with the drawings in which:

FIG. 6 is an enlarged view of the area identified by circle 6—6 in FIG. 4;

FIG. 7 is an enlarged view of the area identified by circle 7—7 in FIG. 5;

FIG. 8 is a fragmentary perspective view of the central shell of the recuperator according to the present invention;

FIG. 9 is a view similar to FIG. 8 showing the central shell of the recuperator with turbulators added;

FIG. 10 is a perspective view showing a turbulator according to the present invention;

FIG. 11 is a fragmentary sectional view through the central recuperator shell shown in FIG. 9;

FIG. 12 is a top view showing the surface pattern of the turbulator shown in FIG. 10;

FIG. 13 is a view similar to FIG. 12 showing an alternative surface pattern for the turbulator;

FIG. 14 is a view similar to FIGS. 12 and 13 showing another alternative surface pattern;

FIG. 15 is a perspective view showing a preparatory step in a method of making the turbulator of FIG. 10.

FIG. 16 is a perspective view showing a method of forming the surface pattern of FIG. 12;

FIG. 17 is a perspective view showing an alternative surface pattern;

FIG. 18 is a perspective view showing a further step in the method of making the turbulator;

FIG. 19 is a top view of FIG. 18;

FIG. 20 is a bottom view of FIG. 18;

FIG. 21 is a sectional view taken through line 21—21 of FIG. 18;

PREFERRED EMBODIMENT OF THE PRESENT INVENTION

Figure 1:
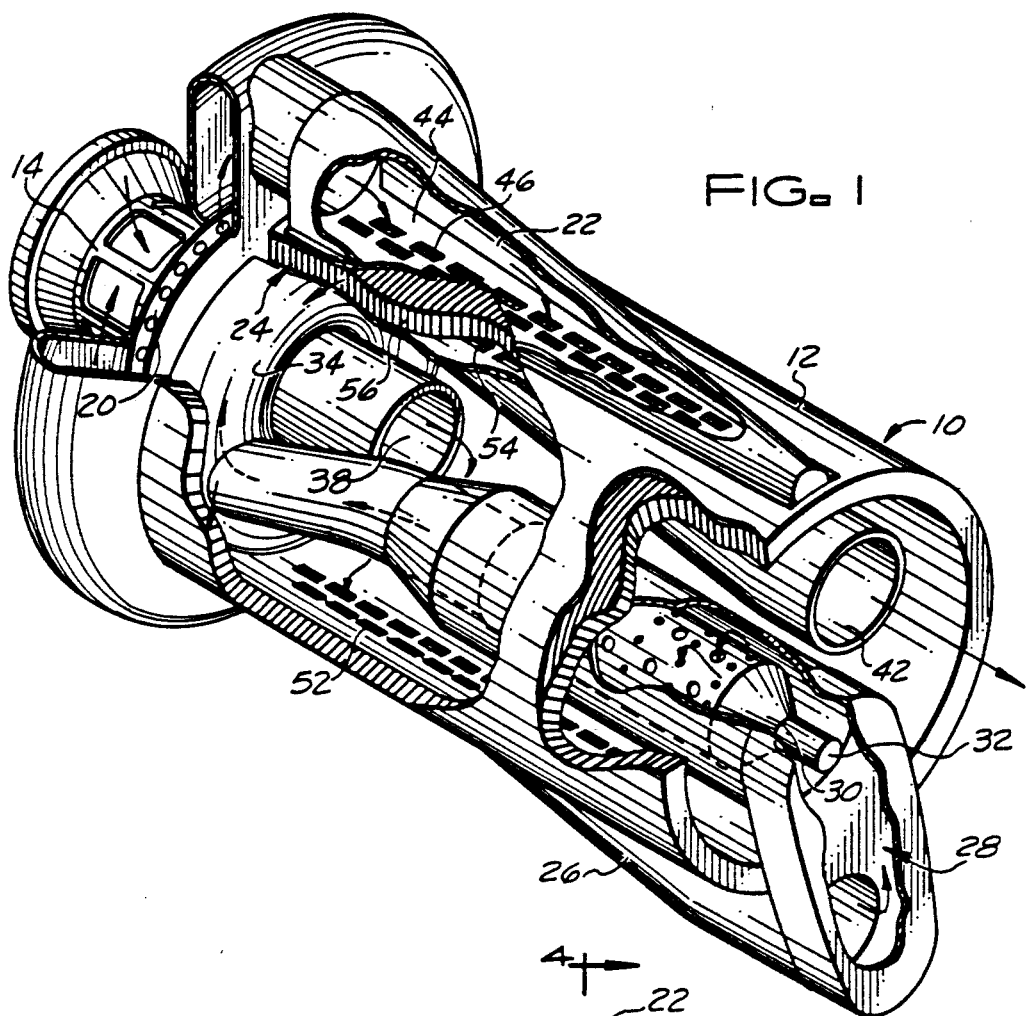
FIG. 1 is a perspective view, with the back end removed and portions broken away, of a recuperated gas turbine engine according to the instant invention.
Figure 2:
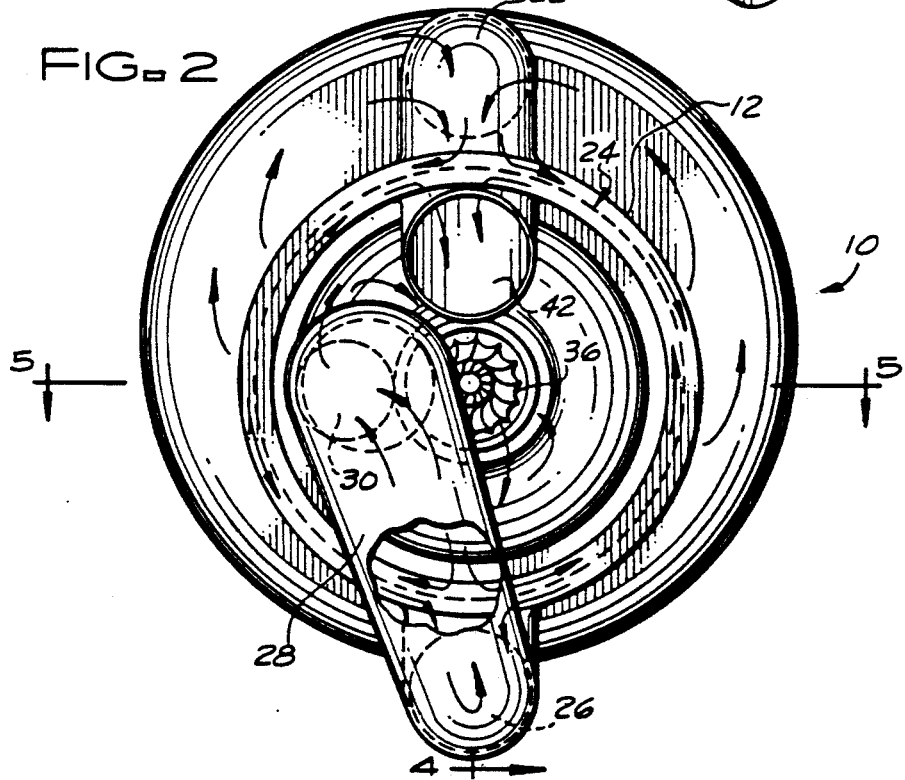
FIG. 2 is a view from the back end of FIG. 1.
Figure 3:
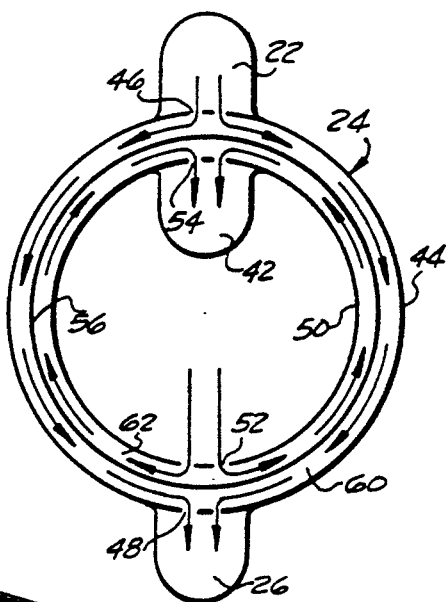
FIG. 3 is a schematic view showing the flow of air and gases through the recuperator of the instant invention.
Figure 4:
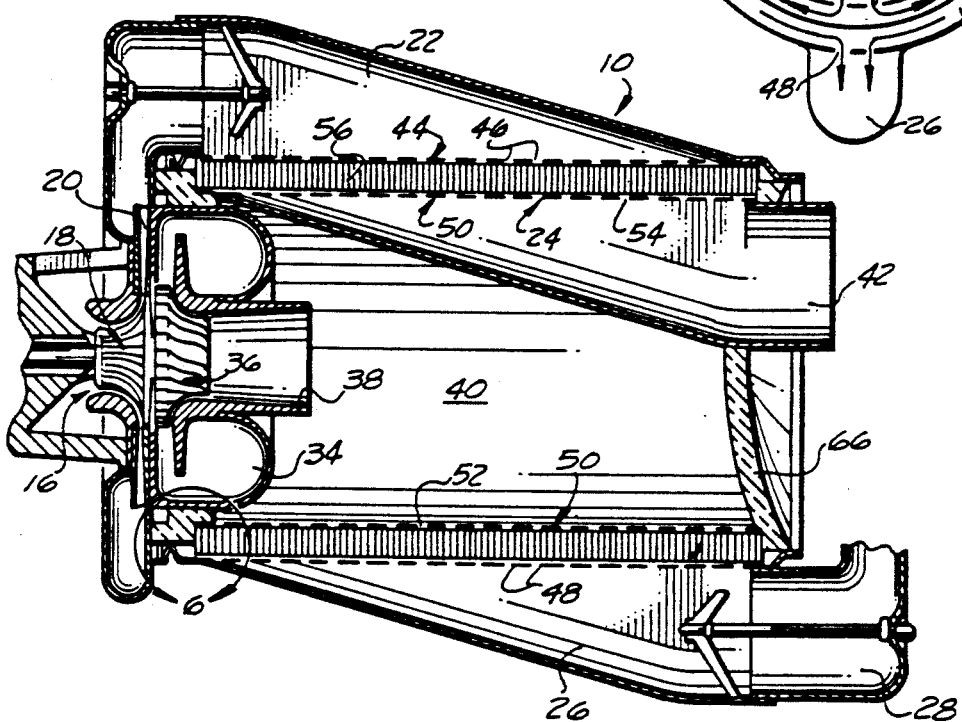
FIG. 4 is a vertical sectional view taken through line 4—4 of FIG. 2.
Figure 5:
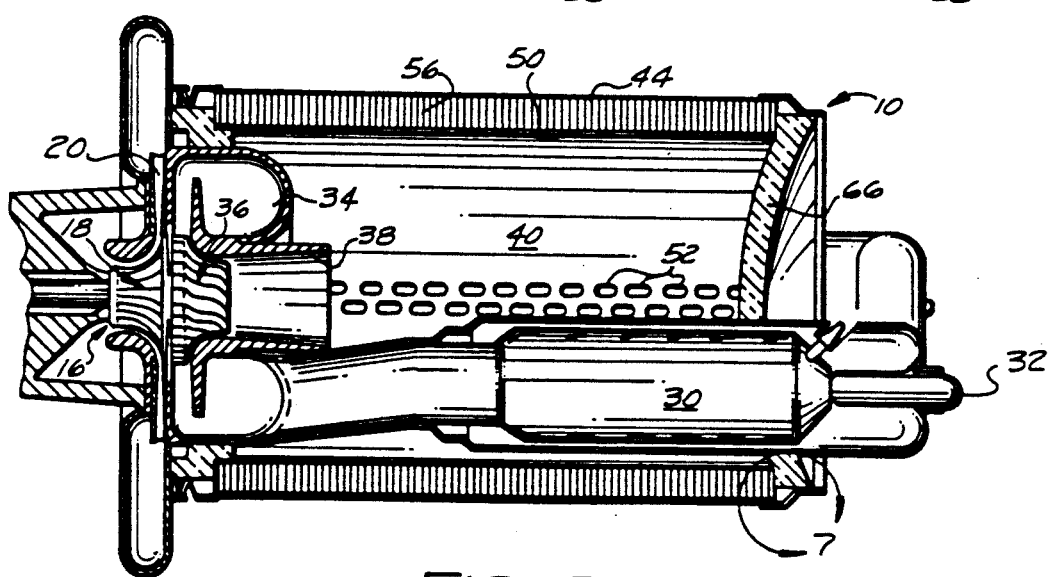
FIG. 5 is a horizontal sectional view taken through line 5—5 of FIG. 2.

Turning now to the drawings in which like reference characters indicate corresponding elements throughout the several views, attention is first directed to FIGS. 1–5, which show a recuperated gas turbine engine 10 according to the present invention.

The engine 10 includes a generally tubular casing 12, one end of which carries the collector 14 of a centrifugal compressor 16 having an impeller 18 which compresses incoming air and directs it generally radially through a pipe diffuser 20. The air from the diffuser 20 enters a generally conical header 22 extending along substantially the entire length of the top of the casing 12. From the header 22, the air enters a recuperator, or heat exchanger, 24 where it is preheated before being expelled into a conical bottom header 26 and through a connecting duct 28 into a combustion chamber 30. In the combustion chamber 30, the air is ignited with fuel from an atomizer 32, producing extremely hot gases which are then directed into the scroll 34 of a radial inlet turbine 36. The gases are expanded in the turbine 36 and discharged axially through the turbine nozzle 38 into a central chamber 40. From the central chamber 40, the gases move back through the recuperator 24 to an axial exhaust 42.

Still referring to FIGS. 1–5, with additional reference to FIGS. 6–8, the recuperator 24 comprises three concentric cylindrical shells which completely wrap around or encircle the hottest components of the engine 10, including the combustor 30, turbine nozzle 38, and central chamber 40. The outermost shell 44 includes a plurality of longitudinally spaced apart inlet openings 46 which open into the upper header 22 to receive relatively low temperature air from the compressor 16. A plurality of longitudinally spaced apart outlet openings 48 located diametrically opposite the inlet openings 46 open into the bottom header 26. The innermost shell 50 includes a plurality of inlet openings 52 which are located at approximately the same radial position as the outlet openings 48 of the outermost shell 44, and which open into central chamber 40 to receive high temperature gases exhausted from the turbine 36. A plurality of outlet openings 54 located diametrically opposite the inlet openings 48 and at approximately the same radial location as the inlet openings 46 of the outermost shell 44 open into exhaust duct 42.

The central shell 56, as best seen in FIGS. 6–8, is a corrugated tube which acts as a separator wall preventing mixing of the high pressure air discharged from the compressor with the low pressure gases exhausted from the turbine, but allowing heat transfer therebetween. The spaces between each corrugation, or fold, 58 of the central shell 56 and the outermost shell 44 define a plurality of annular flow chambers 60 for the high pressure, relatively low temperature air, while the corresponding spaces between the central shell 56 and the innermost shell 50 define a plurality of annular flow chambers 62 for the low pressure, high temperature turbine exhaust gases. As is clear from FIG. 3, the low temperature air from in the outer chambers 60 travels in the direction opposite to the flow of high temperature gases in the inner chambers 62. Thus, the recuperator 24 is classified as a counterflow heat exchanger. In addition, since the thin corrugated wall of the central shell 56 is the only surface through which heat is conducted, the recuperator 24 is also classified as a primary surface heat exchanger. The counterflow, primary surface arrangement results in optimal heat transfer Because the gases exhausted from the turbine 36 are extremely hot (approximately 1,400° F.) relative to the air discharged from the compressor 16 (approximately 350° F.), special provisions must be made to minimize thermal stresses in the recuperator 24. Accordingly, a mounting arrangement which allows the inner shell 50 of the recuperator 24 to expand freely in response to temperature increases is shown in FIGS. 6 and 7. Specifically, the end of inner shell 50 on the exhaust side of the engine 10 includes a radially out-turned flange 64 which is loosely clamped between a terminal fold 58 of the central shell 56 and the end wall 66 of the casing, as shown in FIG. 7. The flange 64 is free to increase in length in response to increases in temperature. In addition, the opposite end of the inner shell is totally unrestrained, as shown in FIG. 6, to allow the shell to expand in an axial direction. Similarly, ample space is provided between the crests of each of the folds 58 of the central shell 56 and the inner shell 50 to allow the folds 58 to expand radially inwardly.

Outer shell 44, on the other hand, is subjected to much smaller temperature increases and does not expand significantly when the engine 10 is in use. Accordingly, the opposite ends of the outer shell 44 may be fixedly secured by, for instance, resistance welding to the engine casing 12, as shown at 68. The opposite ends of the central shell 56 may also be welded to the outer shell, as shown at 70. Although the ends of the central shell 56 are constrained, the corrugations 58 are free to respond to thermal changes by compressing and expanding longitudinally in much the same manner as the individual folds of a bellows. Since thermal expansion in a transverse direction is already provided for by the spacing between the crests of the corrugations 58 and the inner shell 50, to such spacing is required between the opposite sides of the corrugations and the outer shell 44.

Although the strength requirements of the recuperator 24 are minimal, the inner shell 50 is vulnerable to oxidation because of the extremely high temperatures to which it is subjected. Accordingly, the inner shell 50 must be formed of corrosion-resistant material, such as a high grade alloy. The central shell 56 and the outer shell 44 may be formed of less corrosion-resistant materials, such as lower grade alloys, since they are less prone to oxidation, and since the minimal brazing required in the mounting arrangement of FIGS. 6 and 7 eliminates the need for outer shell 44, inner shell 50, and central shell 56 to be formed of compatible materials.

FIG. 10 shows a turbulator 72 suitable for inclusion between the corrugations 58 of the central shell 56. The turbulator 72 comprises a ring 74 having its inner circumference 76 crimped to form a wavy surface. A plurality of openings 78 extend through the surface to allow fluid to pass from one side of the ring 74 to the other. The ring 74 is preferably not continuous, but includes a pair of slightly spaced apart ends 80, 82 which allow for expansion and compression in a circumferential direction.

The size, shape, pattern, and number of openings 78 may be selected according to the design requirements of the engine 10, and the amount of turbulence required. FIGS. 9-12 show a pattern of circular openings 78 which may be suitable for certain applications. FIG. 13 shows an alternative pattern of transversely extending rectangular openings 78A, which may be suitable for other applications, while FIG. 14 shows still another pattern, comprising multiple rows of longitudinally extending rectangular openings 78B, which may be suitable for yet other applications.

Each turbulator 72 is inserted into one of the annular chambers 60 or 62 of the recuperator 24 such that the turbulator 72 is coaxial with the central shell 56, and the waves or undulations 84 formed by the crimped inner edge 76 of the ring 74 are generally perpendicular to the folds of the shell 56, as shown in FIGS. 9 and 11. The alternating crests of the waves 88 are essentially clamped between the folds 58, thus mechanically holding the turbulators 72 in place. Although FIGS. 9 and 11 show the turbulators 72 positioned in only the inner, high temperature chambers 62 of the recuperator 24, it will be clear to the practitioner of ordinary skill in the art that they may be similarly positioned in the outer, lower temperature chambers 60 as well.

A simple, low cost method of forming the turbulators 72 of the present invention is illustrated in FIGS. 15-20. First, a metal having desired properties such as corrosion-resistance is rolled into sheet form, as shown in FIG. 15, and cut into rectangular strips 84 using appropriate cutting tools 86. The length L of each strip 84 is selected to equal the desired outer circumference of the turbulator 72.

Next the sheet 84 is sheared between a punch 88 and a die block 90 to produce a plurality of circular openings 78, as shown in FIG. 16, or openings of other configurations, such as the rectangular openings 78B shown in FIG. 17.

Finally, the sheet 84 is passed between a pair of specially configured crimping rollers 92, 94, as shown in FIGS. 18-21. The upper end 96 of each roller is circular, while the lower end 98 comprises a plurality of rounded teeth 100. The rollers are arranged such that their longitudinal axes are parallel, and the circular upper ends share a common tangent, while the rounded teeth 100 of the lower ends 98 mesh along curved line located below the point of tangency.

As the sheet 84 passes between the rollers 94, 96 the lower edge 102 of the sheet 84 is crimped between the meshing teeth 100 of the rollers. This crimping action effectively decreases the length 1 of the lover edge 102 of the sheet relative to the length L of the upper edge 104. As the difference between the length L of the upper edge 104 and the length 1 of the lower edge 102 increases, the sheet 84 begins to curve about an axis perpendicular to the axes of the rollers 92, 94, until eventually the sheet 84 forms a ring 24, as shown in FIG. 10. The upper edge 104 of the sheet is now the outer circumference of the ring 74, and the lower edge 102, is the inner circumference of the ring 74. Thus, the diameter of the rollers 92, 94 and the number of rotations necessary to form the ring 74 can easily be calculated, using simple algebraic and geometric equations when the desired inner and outer diameters of the turbulator ring 74 are known.

Other methods of manufacturing the turbulator 72 may of course be used. However, the rolling technique disclosed herein is believed to be more cost effective than common massmanufacturing processes, such as stamping, for producing a limited number of annular turbulators.

Figure 22:
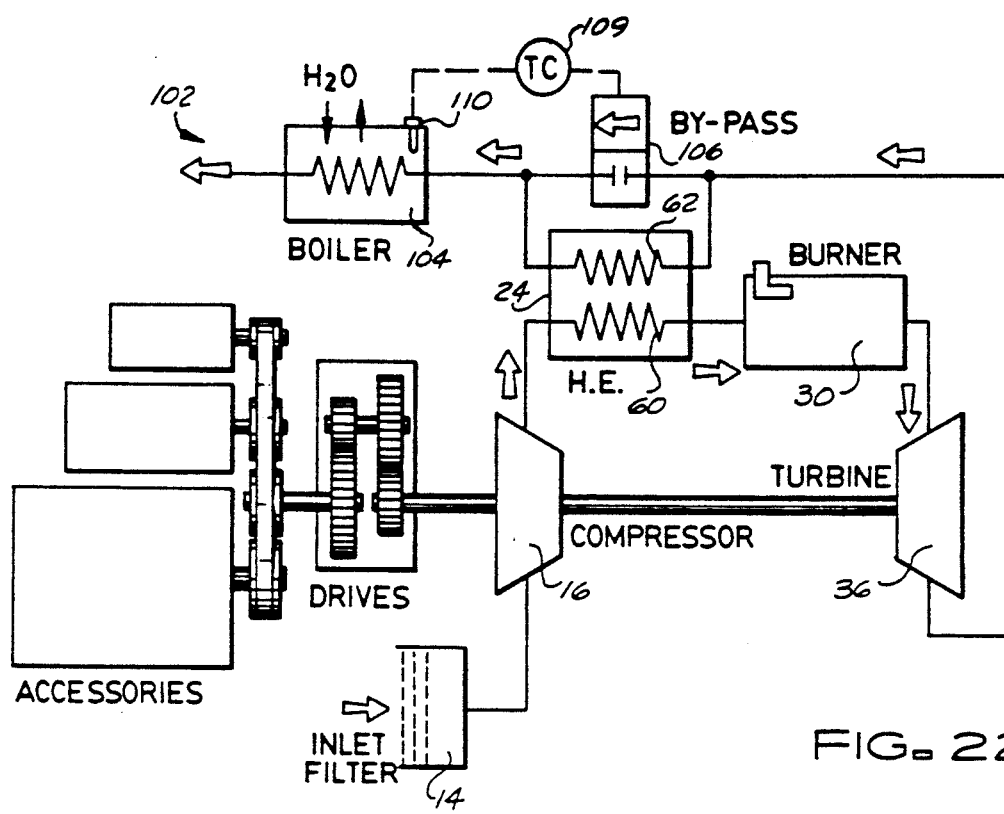
FIG. 22 is a flow chart of a cogeneration system using the recuperator of the instant invention.
Figure 23:
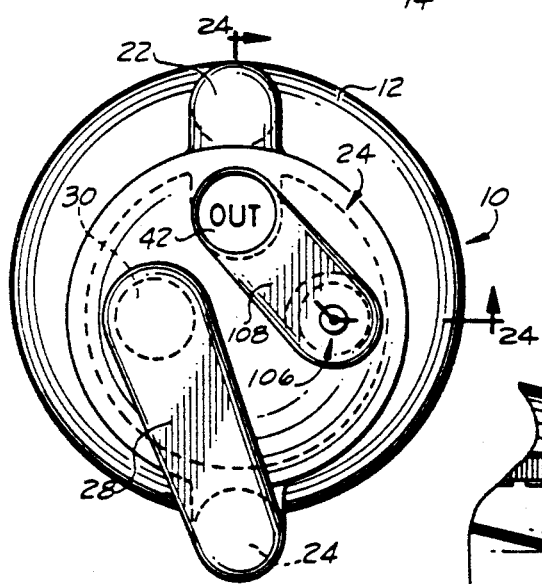
FIG. 23 is a perspective view from the rear, similar to FIG. 2, showing a recuperated engine for use with the cogeneration system of FIG. 22.
Figure 24:
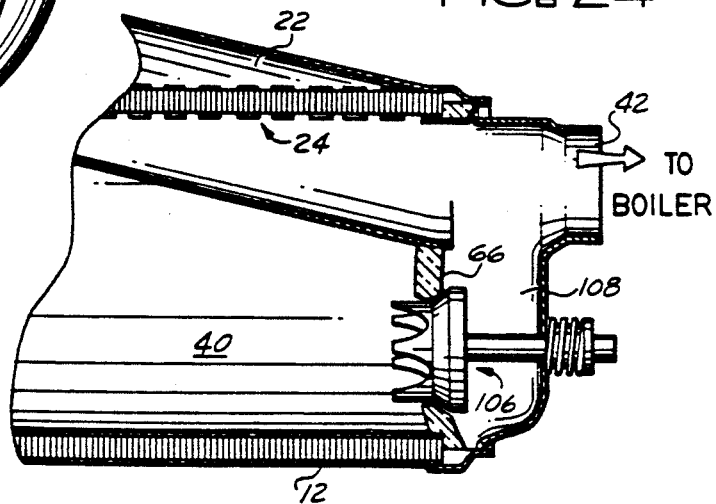
FIG. 24 is a fragmentary vertical section of the engine of FIG. 23.

Turning now to FIGS. 22-24, a cogeneration system 102 using the recuperated engine 10 of the present invention is shown. As described earlier, the engine 10 comprises a compressor 16, which receives atmospheric air from a collector or inlet filter 14, compresses it, and passes it on to a combustion chamber or burner 30, where it is ignited to produce high temperature gases. The high temperature gases are then expanded in the turbine 36, which converts the energy of the gases into useful work. Interposed between the compressor 16 and the burner 30 is the recuperator 24, the high temperature side 62 of which receives the gases exhausted from the turbine 36 for preheating the air in the low temperature side 60 as it passes from the compressor 16 to the burner.

In the embodiment of FIGS. 1-5, all of the waste heat from the turbine 36 is directed into the high temperature side 62 of the recuperator 24, and is then dumped into the atmosphere via the exhaust duct 42. Such a system is wasteful from an energy standpoint, and undesirable from an environmental standpoint since much of the gas exhausted my be noxious. In the cogeneration system 102 of this embodiment, such problems are eliminated by coupling the output end of the exhaust duct 42 to a boiler 104 or other energy recovery device, where the exhaust heat is used to produce steam heat or similar useful energy. Furthermore, a valve 106 is placed in the end wall 66 of the engine casing 12 to selectively allow a controlled volume of the turbine exhaust gases in central chamber 40 to enter a duct 108 which bypasses the recuperator 24 and merges with the turbine exhaust duct 42 to deliver the gases directly to the boiler 104.

The action of the valve 106 is governed by a control circuit 109 which receives input from a thermocouple 110 located in the boiler 104 to ensure that the temperature of the gases entering the boiler 104 remains substantially constant. This is achieved by regulating the volume of gas passing through the recuperator 24 relative to the volume of gases passing through the bypass duct 108. For example, if the thermocouple 110 detects that the temperature of gases entering the boiler 104 has fallen below the desired level, the valve 106 will move into an open position, allowing some or all of the gas to bypass the recuperator 24. The temperature of the gas which bypasses the recuperator will be nearly the same as the outlet temperature of the turbine 36, and thus will act effectively to raise the temperature in the boiler 104. On the other hand, if the thermocouple 110 senses that the inlet temperature of the boiler 104 has risen above the desired level, the valve 106 will move back towards its closed position, so that a larger volume of gas passes through the recuperator 24. The gas in the recuperator 24 loses a great deal of heat to the air exhausted from the compressor 16, thus bringing the inlet temperature of the boiler 104 back down to its desired level in a relatively short period of time.

Figure 25:
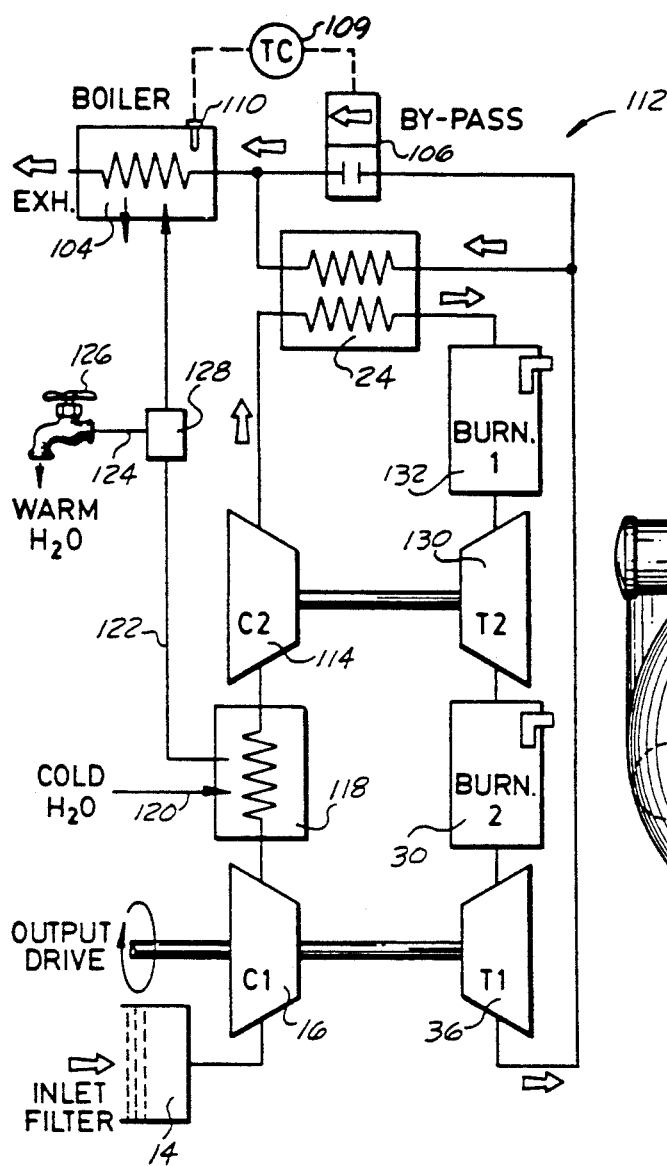
FIG. 25 is a flow chart of a second cogeneration system utilizing the recuperator of the present invention.
Figure 26:
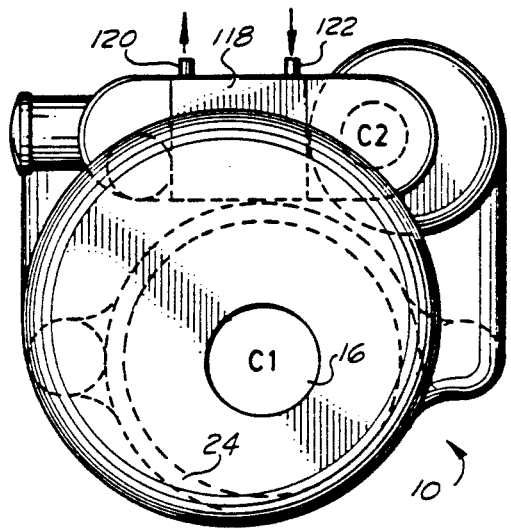
FIG. 26 is a front view of a recuperated engine for use with the cogeneration system of FIG. 25.
Figure 27:
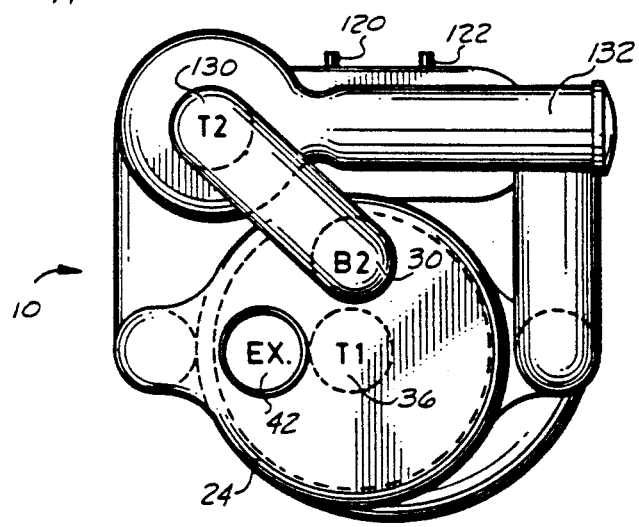
FIG. 27 is a rear view of the recuperated engine of FIG. 26.

In the cogeneration system 112 illustrated in FIGS. 25-27, the waste heat from the turbine 36 is exhausted into a boiler 104 as in the previous system 102, with a bypass conduit 108, valve 106, and thermocouple 110 being provided to maintain the boiler inlet temperature at a constant level. However, in this system, still more work is derived from the engine 10 by adding additional stages of compression, heating, and expansion.

Specifically, a second compressor 114 is added downstream of the first compressor 16, and an air-to-water heat exchanger, or intercooler, 118 is interposed between the two compressors 16, 14. The intercooler 118 utilizes part of the heat of the air exhausted from the first compressor 16 to raise the temperature of cold water entering through an inlet duct 120. The warmed water is then discharged through an outlet duct 122 which delivers the water to the boiler 104. A second duct 124 may also be provided for delivering the water to an alternative output device, such as a faucet 126, with a valve 128 being provided for selectively controlling the volume of water delivered to the boiler relative to the volume delivered to the alternative output device 126.

The cogeneration system 112 also comprises a second turbine 130 for driving the second compressor 114, and a second combustion chamber 132 interposed between the turbines 36, 130, for reheating the gases exhausted from the second turbine 130 before their entry into the first turbine 36. The additional stages of compression, expansion and reheating serve to increase the temperature and pressure ratios of the engine 10, and thus increase the net energy output of the system 112.

Figure 28:
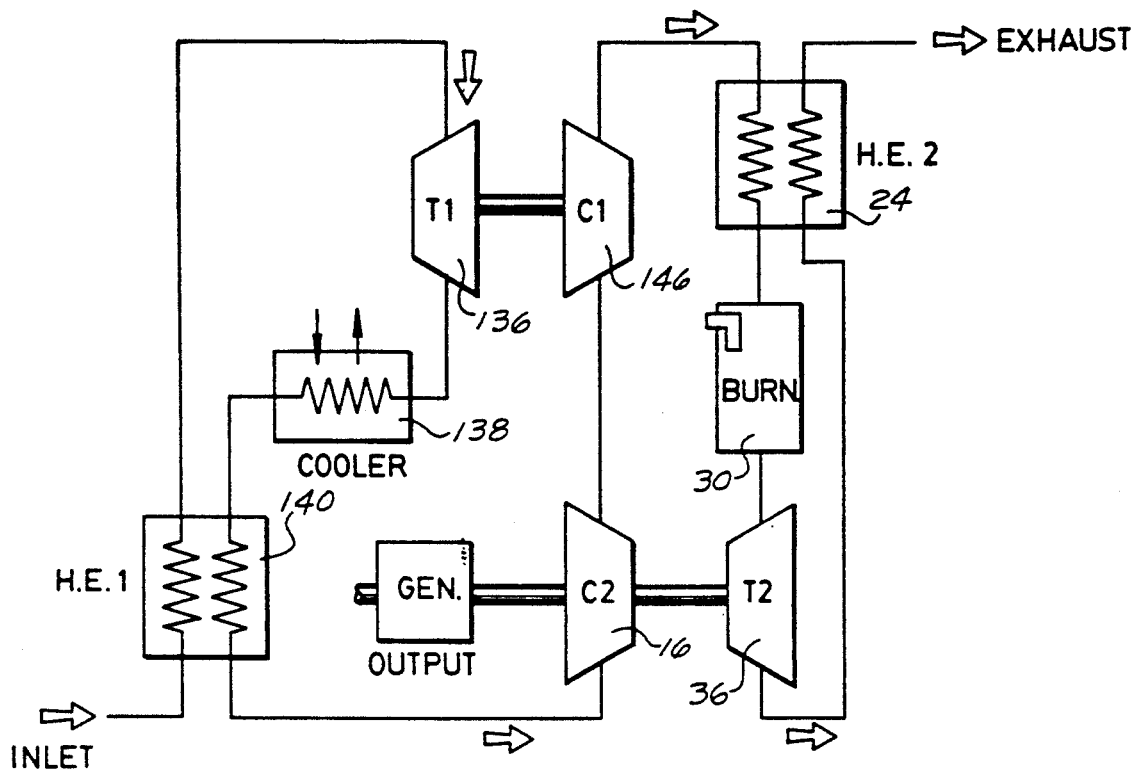
FIG. 28 is a flow chart of an integrated air cycle-gas turbine engine using the recuperator of the present invention.
Figure 29:
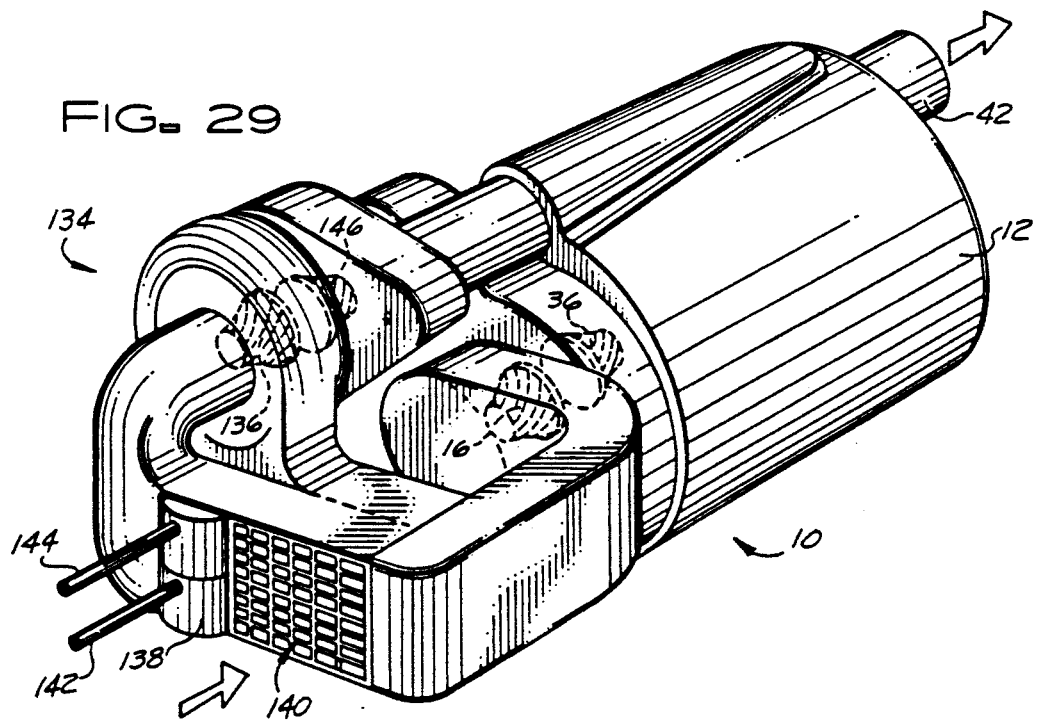
FIG. 29 is a perspective view showing the integrated air cycle-gas turbine engine of FIG. 28.

Finally, FIGS. 28 and 29 illustrate a system 134 in which the recuperated engine 10 of the present invention is integrated with an air conditioning or cooling cycle. In this system 134, an additional turbine 136, an air-to-water heat exchanger 138, and an air-to-air heat exchanger 140 are added upstream of the engine 10. Incoming air at atmospheric temperature is expanded and cooled in the additional turbine 136 and then passes through the air-to-water heat exchanges 138, where it is used to cool warm water entering through an inlet duct 142 to a suitable drinking temperature. The cooled water is then discharged through an outlet duct 144. The air, which is still cooler than atmospheric temperature despite having been warmed in the air-to-water heat exchanger, pre-cools the incoming atmospheric temperature air.

The output shaft of the additional turbine 136 is coupled to an additional compressor 146 downstream of the original compressor 16 of the engine 10. As a result, the pressure of the compressed air entering the combustion chamber 30 is lower than in the simplified version of the engine 10 illustrated in FIGS. 1-5, and the net pressure ratio and performance of the engine 10 are increased correspondingly. Other than this, the structure and function of the remaining components of the engine 10 are identical to those of their counterparts in the first embodiment.

One potential application for the integrated system 134 illustrated in FIGS. 28 is in military operations in the desert, where there is a need for low cost, lightweight power generation devices and cool drinking water for military personnel.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An integrated air cycle-gas turbine engine comprising:
  a) air entry means for receiving air at atmospheric conditions;
  b) a first turbine downstream of said air entry means for expanding and cooling said air;

c) an air-to-water heat exchanger downstream of said first turbine, said air-to-water heat exchanger including
  i) air inlet means for admitting cooled expanded air from said first turbine;
  ii) air outlet means for expelling said expanded air;
  iii) water inlet means for admitting warm water;
  iv) water outlet means for discharging said water; and
  v) separator means for separating said expanded air from said water and conducting heat therebetween;
d) an air-to-air heat exchanger downstream of said air-to-water heat exchanger, said air-to-air heat exchanger including
  i) first inlet means for receiving expanded air from said air outlet means of said air-to-water heat exchanger;
  ii) first outlet means for discharging said expanded air;
  iii) second inlet means communicating with said air entry means for receiving atmospheric air;
  iv) second outlet means for discharging said atmospheric air into said first turbine; and
  v) separator means for separating said expanded air from said atmospheric air and conducting heat therebetween;
e) a combustion chamber having means supplying fuel thereto;
f) a first compressor, driven by said first turbine, for supplying compressed air to said combustion chamber;
g) a second compressor, downstream of said air-to-air heat exchanger and upstream of said first compressor, for receiving expanded air from said first outlet means and pre-compressing said air prior to entry into said first compressor;
h) a second turbine, downstream of said combustion chamber, for extracting energy produced in said combustion chamber and driving said second compressor; and
i) a recuperator including
  i) first inlet means for admitting compressed air from said first compressor;
  ii) first outlet means for expelling said compressed air;
  iii) second inlet means for admitting high temperature exhaust from said second turbine;
  iv) second outlet means for expelling said exhaust; and
  v) separator means for separating said compressed air from said turbine exhaust and for conducting heat therebetween.

2. An integrated air cycle-gas turbine engine according to claim 1, wherein said recuperator is a primary surface counterflow heat exchanger encircling said second turbine and said combustion chamber.

* * * * *